United States Patent Office
2,942,622
Patented June 28, 1960

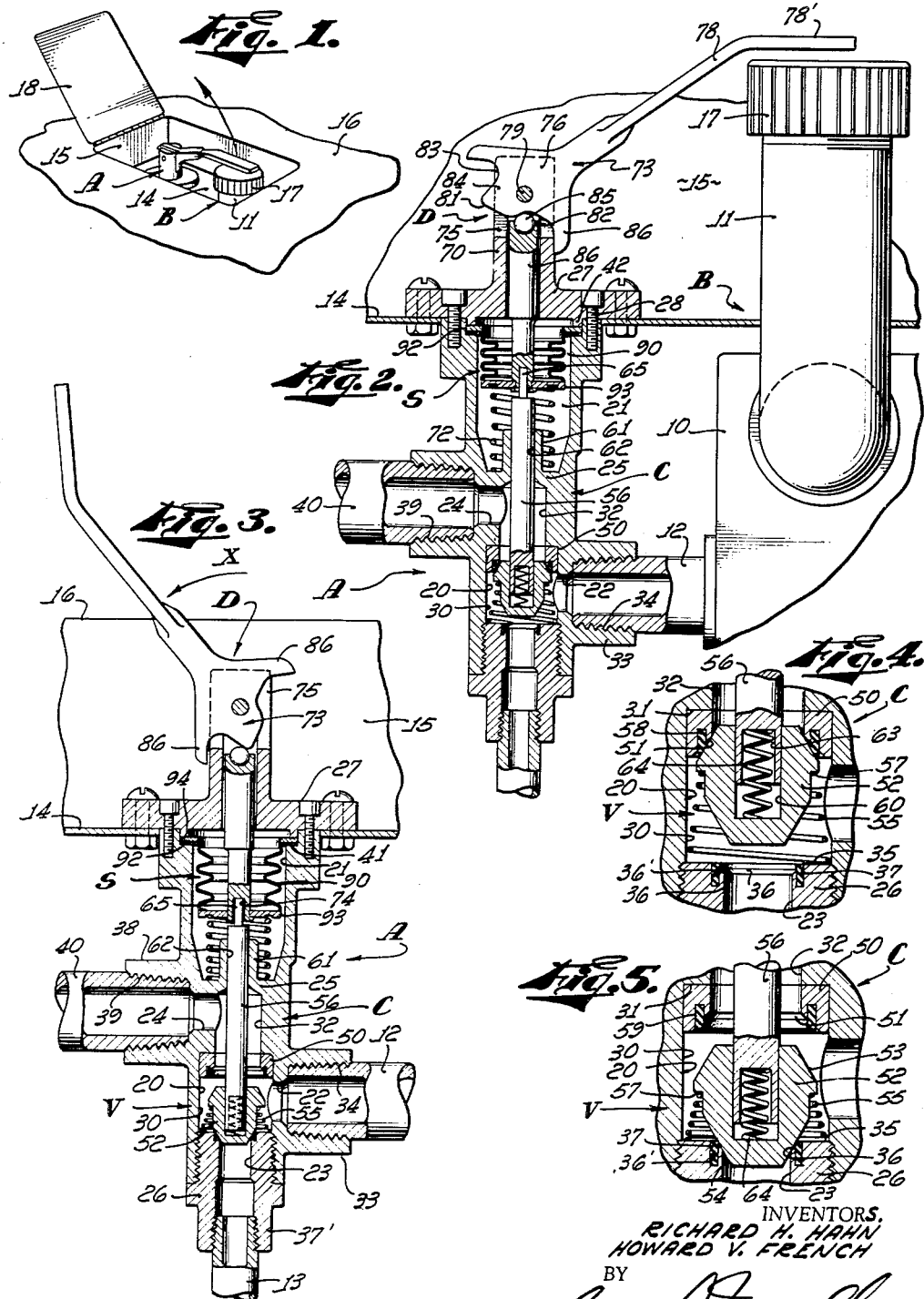

2,942,622

VENT VALVE

Richard H. Hahn, Burbank, Calif., and Howard V. French, Sepulveda, Calif. (both % Airborne Research & Development Corp., 7530 San Fernando Road, Sun Valley, Calif.)

Filed Sept. 18, 1957, Ser. No. 684,663

10 Claims. (Cl. 137—625.5)

This invention has to do with a valve and is more particularly concerned with a manually operable vent valve for releasing pressure in a system handling liquid oxygen, or the like.

In systems adapted to handle liquid oxygen, as for instance systems installed in high altitude aircraft for supplying oxygen to the pilot and including a suitable pressure supply tank, it frequently becomes necessary to vent the system and release the pressure therein as for the purpose of refilling the supply tank.

The valves ordinarily used to vent such systems are conventional poppet-type valves having rotatable screw-type operating stems projecting therefrom and provided with suitable hand wheels, or the like, at the outer ends thereof. Due to the extreme low temperatures and high pressures encountered while venting such systems, which temperatures and pressures approach minus 300° F. and 300 p.s.i., it is impossible to properly or adequately seal around the rotating operating stems of the ordinary vent valves, with the result that as the valves are opened, liquid oxygen leaks out about the stems. Such leakage lowers the temperature of the hand wheel to a point where it is much too cold to touch or operate by hand. Further, such leakage often occurs so rapidly and at such a rate that the hand of the person opening the valve is severely frostbitten or burned. Still further, the ordinary or conventional vent valve used in such systems have metal seats and metal valve elements which are fixed rigidly to the valve stems and are engageable against the seats. When the valves are opened the engaging surfaces of the seats and valve elements frequently become frosted, and to a degree as to prevent proper seating of the valve element when it is desired to close the valve. When this occurs, the valve remains cracked and allows liquid oxygen to escape from the system. Still further, due to the extreme changes in temperature and as a result of expansion and contraction of various parts of the ordinary vent valve construction, when it is opened and closed again, the valving surfaces frequently cannot be brought into proper seating engagement with each other in one operation, but must be adjusted several times as the temperature of the construction returns to normal.

An object of the present invention is to provide a vent valve construction for use in systems handling fluids such as liquid oxygen at extremely low temperatures and at high pressures, which valve has a novel leak-proof operating mechanism and is such that it can be operated without leakage about the operating stem and the resulting hazards normally associated with such valves.

Another object of the present invention is to provide a valve of the character referred to having a novel valve seat and valve element which is not adversely affected by the extreme variations in temperature and resulting expansion and contraction of the elements of the valve construction.

A feature of the present invention is to provide a poppet-type vent valve having a longitudinally shiftable valve stem projecting into a trap chamber remote from the flow passage in the valve, a manually operable longitudinally shiftable operating stem projecting into the trap chamber to engage the valve stem and a longitudinally extendable bellows seal within the said trap chamber and extending between the stems.

Another feature of our invention is to provide a valve seat having a sealing ring of yieldable material such as polytetrafluoroethylene, engaged therein, which ring is engaged to a predetermined extent by the valve element when the said element is fully engaged in the seat and so that the ring is not subject to being mutilated and rendered ineffective as by extrusion, or the like, when the valve is closed.

An object of the present invention is to provide a novel vent valve of the general character referred to which is easy and economical of manufacture and which is both highly effective and dependable in operation.

The various objects and features of our invention will be fully understood from the following detailed description of a typical preferred form and application of our invention, throughout which description reference is made to the accompanying drawings, in which:

Fig. 1 is a perspective view of the valve construction that we provide and showing it engaged in a well provided in the skin or surface of an aircraft, or the like, and related to a filter cap located within the well.

Fig. 2 is an enlarged detailed sectional view of our valve construction and showing it in an unactuated or closed position.

Fig. 3 is a view similar to Fig. 2 and showing our valve construction in an actuated or open position.

Fig. 4 is an enlarged detailed sectional view of a portion of the construction that we provide and showing the seat and valve element in closed relationship with each other.

Fig. 5 is a view similar to Fig. 4 and showing the valve seat and valve element in an open position.

The valve construction A provided by the present invention is particularly adapted for use in connection with an oxygen supply system B in an aircraft, which system is shown as including, a pressure supply tank 10, a filler pipe 11 projecting upwardly from the tank, an outlet pipe 12 communicating with the tank, and a delivery line 13 communicating with the outlet pipe and adapted to conduct oxygen from the tank to the cabin or cockpit of the aircraft and other apparatus normally associated with such systems.

The filler pipe 11, in accordance with normal aircraft construction, is shown projecting upwardly through the bottom wall 14 of a well 15 provided in the skin 16 of the aircraft to which it is related, to terminate below the plane of the skin, and is provided with a suitable closure cap 17, which is screw threaded onto the upper end thereof. The well 15 into which the filler pipe projects opens upwardly and is provided with a suitable hinged cover plate 18, which plate, when closed, is flush with the skin 16 of the aircraft.

The valve construction A is shown as including a body C having a flow chamber 20 and a trap chamber 21, an inlet port 22 connected with the outlet pipe 12 to establish open communication between said pipe 12 and the flow chamber, an outlet port 23 to connect with the delivery line 13 of the system B and establishing open communication with said line and the flow chamber, a vent port 24 communicating with the flow chamber, and a valving means V arranged within the flow chamber and adapted to selectively control the flow of fluid in the flow chamber out through the outlet and vent ports. The construction is shown as further including manually operable actuating means D related to the valve means V and projecting through the trap chamber 21 of the body to the exterior of the construction, and sealing means S within the trap chamber and establishing a fluid tight seal between the body and actuating means.

The body C of the valve construction A that we provide is an elongate vertically disposed member formed as by casting.

The flow and trap chambers 20 and 21 extend longitudinally of the body and are located in the upper and lower portions of the body. The chambers 20 and 21 are separated one from the other by a central horizontally disposed partition 25.

The lower end of the flow chamber 20 is closed by a plug-like insert 26 threadedly engaged in the lower terminal end of the body, while the upper end of the trap chamber is closed by a plate-like cap 27, which cap is secured to the body by a plurality of circumferentially spaced screw fasteners 28, as clearly illustrated throughout the drawings.

The lower flow chamber 20 extends longitudinally of the lower portion of the body and has a lower portion 30 extending upwardly from the lower terminal end of the body and terminating within the body to establish a downwardly facing shoulder 31 therein and an upper portion 32 of reduced diameter continuing upwardly from the shoulder and terminating at the partition 25.

The inlet port 22 is a laterally disposed port in one side of the body C and establishes open communication with the lower portion 30 of the flow chamber 20, below the shoulder 31. A suitable laterally outwardly projecting boss 33 is provided on the body in axial alignment with the inlet port 22. The boss 33 is internally threaded as at 34 and threadedly receives the end of the outlet pipe 12 extending from the tank 10 and which is adapted to conduct fluid from the tank through the port and into the said flow chamber.

The outlet port 23 is a central vertically disposed and downwardly opening port extending longitudinally through the insert 26 engaged in the lower end portion of the flow passage 20. The insert 26 has a flat horizontally disposed top 35, which occurs in spaced relationship from and opposes the shoulder 27 in the body and is provided with an upwardly disposed annular inclined valve seat 36, concentric with the port 23 extending therethrough. The seat 36 has an annular groove 36' about its outer periphery and in which a suitable sealing ring 37 is engaged. The sealing ring 37 projects upwardly from the seat. The seat 36 and the sealing ring 37 are adapted to cooperate with an element of the valving means V, as will hereinafter be described.

The lower end of the insert 26 is provided with an internally threaded tubular extension 37' adapted to threadedly receive the end of the delivery line 13 of the system B, as clearly illustrated throughout the drawings.

The vent port 24 is a lateral port in the side of the body C opposite the inlet port and establishes open communication with the upper portion 32 of the flow chamber 20. A suitable laterally projecting boss 38 is provided on the body C in axial alignment with the vent port 24, which boss is internally threaded as at 39 and threadedly receives a suitable vent pipe 40, which pipe extends to a suitable exhaust point or station spaced from the construction.

The upper trap chamber 21 has a substantially straight bore continuing upwardly from the partition 25 to a point adjacent the upper terminal end of the body. The upper terminal end of the body is provided with a radially inwardly and upwardly opening annular recess 41 about the bore of the chamber and adapted to cooperatively receive an element of the sealing means S and a downwardly projecting annular rib 42 provided on the under or bottom side of the cap 27, as clearly illustrated in the drawings and as will hereinafter be described.

The valve means V that we provide is shown as including an annular seat ring 50 pressed or otherwise engaged into the lower portion 30 of the flow chamber 20 to establish bearing engagement against the downwardly facing shoulder 31 therein and having a radially inwardly and upwardly inclined annular seating face 51, an elongate vertically disposed valve element 52 having upper and lower radially inwardly inclined sealing faces 53 and 54, and engaged in the flow passage to be selectively shifted into and out of engagement with the seating face 51 of the seat ring and the valve seat 36 in the plug-like insert 26 engaged in the lower end of the flow passage and to thereby selectively control the flow of fluid through the outlet and vent ports 22 and 24. The valve means V is shown as further including a compression spring 55 between the valve element 52 and the top 35 of the insert 26 and adapted to normally yieldingly urge the said valve element upwardly into engagement with the seat ring 50, and a longitudinally shiftable valve stem 56 engaged with the valve element 52 to project upwardly therefrom, through the partition 25 in the body C and into the trap chamber 21 where it is engaged by the manually operable actuating means D, and the sealing means S, as will hereinafter be described.

In the case illustrated, the valve element 52 is provided with a downwardly facing annular shoulder 57 and against which the upper end of the spring 55 engages or seats. In the preferred embodiment of the invention and as clearly illustrated in Figs. 4 and 5 of the drawings, the sealing face 51 of the seat ring 50 is provided with a downwardly opening annular groove 58 and in which an annular seat ring 59 is engaged. The sealing ring 59 is preferably formed of polytetrafluoroethylene, or some other flexible plastic material which will withstand the extreme temperature variations encountered in the handling of liquid oxygen, without becoming brittle or otherwise breaking down and/or being rendered ineffective. The sealing ring 59 projects axially from the seating face 51.

The angle or inclination of the seating face 51 on the seat ring 50 is more acute than the angle or inclination of the sealing face 53 on the valve element 52, with the result that when the valve element is shifted upwardly and into engagement with the seat ring 50, the sealing face 53 thereof only engages the inner periphery of the seat face 51 and the said seat face and sealing face diverge as they extend radially outwardly, as clearly illustrated in Fig. 4 of the drawings.

With the above relationship of parts, it will be apparent that when the valve element is seated in the seat ring, the sealing face 53 thereof engages and seals with the sealing ring 59, but is stopped from establishing excessive pressure engagement therewith, or engagement which would result in extrusion and mutilation of the sealing ring.

The sealing ring 37 and seat 36 of the insert 26 related to the outlet port 23 cooperate with the bottom face 54 of the valve element 52 in the same manner set forth above.

With the construction that we provide, it will be apparent that the valve element 52 establishes limited and controlled bearing and sealing engagement on the sealing rings 37 and 59.

The valve stem 56 of the means V is an elongate vertically disposed member slidably engaged in an upwardly opening socket 60 entering the upper end of the valve element 52, to project upwardly therefrom and through the partition 25 in the body and into the trap chamber 21.

The partition 25 is provided with a suitable central longitudinally disposed boss 61 projecting upwardly into the trap chamber and having a centrally longitudinally disposed bearing opening 62 through which the stem 56 projects.

The lower terminal end of the valve stem 56 is normally spaced from the bottom of the socket 60 in the valve element 52 and is provided with a downwardly opening recess 63 opposing the bottom of the socket. A compression spring 64 is engaged in the recess 63 to project from the lower terminal end thereof and engage the bottom of the socket 60 and normally yieldingly urges the valve element downwardly relative to the stem.

The upper terminal end of the valve stem 56 terminates at a point intermediate the upper and lower ends of the trap chamber 21 and is provided with an upwardly projecting extension 65 of reduced diameter, which extension is adapted to connect with the means D as will hereinafter be described.

The manually operable actuating means D is shown as including, a central elongate vertically disposed tubular post 70 projecting upwardly from the cap 27 secured to and closing the upper end of the body C, an elongate vertically disposed actuating stem 71 slidably engaged through the post to project into the trap chamber 21 and connect with the upper terminal end of the valve stem 56, a compression spring 72 normally yieldingly urging the actuating stem upwardly in the post and a cam actuator 73 pivotally carried by the upper terminal end of the post and engageable with the upper terminal end of the actuating stem and operable to shift the operating stem 71, valve stem 56 and valve element 52 downwardly in the construction.

The lower terminal end of the operating stem 71 is provided with a downwardly opening recess 74 in which the reduced extension 65 on the valve stem is engaged and bottoms.

The upper end portion of the post 70 is notched or slotted to establish a yoke having a pair of laterally spaced upwardly projecting legs 75 between which the cam actuator 73 is engaged and pivotally supported.

The cam actuator 73 is shown as including a flat vertically disposed plate-like body 76 arranged between the legs 75 of the yoke at the upper end of the post 70 and is adapted to engage the upper terminal end of the actuating stem. The body 76 is shown provided with an elongate operating arm 78 projecting laterally therefrom, which arm is engageable to shift or rotate the body relative to the yoke and the actuating stem. The body 76 is carried and supported between the legs 75 of the gate by a suitable pivot pin 79, which pin intersects the central vertical axis of the body. The pin 79 is suitably secured to the legs to extend therebetween and through the cam body, as clearly illustrated in the drawings.

The compression spring 72 of the actuating means D is adapted to normally yieldingly urge the actuating stem 71 upwardly into bearing engagement against the actuator 76. In the case illustrated, the spring 72 is a simple helical compression spring engaged about the upwardly projecting boss 61 on the partition 25 and the valve stem 56, to occur between and bear against the partition and a flange or disc fixed to and projecting outwardly from the lower end portion of the actuating stem 71. The disc referred to above, is part of the sealing means D and will be described as follows.

The plate-like body 76 of the cam actuator 73 has a substantially downwardly facing bottom edge 81, which edge engages the upper end of the actuating stem 71. The edge 81 has end portions 82 and 83 and a substantially square, downwardly projecting lug-like central portion 84 which is offset from the pivotal axis of the plate and normally occurs at one side of the actuating stem, as clearly illustrated in Fig. 2 of the drawings. When the cam is in the unactuated position illustrated in Fig. 2 of the drawings, the actuating stem is allowed to be shifted upwardly in the body C by the spring 72 and the valve element 52 and valve stem 56 are shifted upwardly in the body by the spring 55, so that the said valve element engages in the seat ring 50, thereby preventing the flow of fluid or loss of pressure from the lower portion of the flow chamber 20 into the upper portion thereof and out through the vent port 24. When the cam actuator is rotated in the direction indicated by the arrow X in Fig. 3 of the drawings, the central portion 84 of the actuating stem 71 urges the valve stem 56 and valve element 52 downwardly in the valve body C, against the resistance of the spring 72 and 55 and so that the valve element is shifted from engagement with the seat ring 50 and into engagement with the seating face 36 on the insert 26 in the lower end of the flow passage, and into sealing engagement with the sealing ring 37 carried thereby, thereby shutting off flow through the outlet port 23 and allowing for the free flow of fluid and the release of pressure within the flow chamber 20 and the pressure tank 10 connected therewith, out through the vent port 24. When the cam actuator is fully shifted in the manner set forth above, the lug-like central portion 84 of the bottom edge of the plate-like body occurs in the other or opposite side of the actuating stem 71.

The said lug-like portion 84 on the bottom edge 80 of the cam is adapted to go over the center when it is fully shifted to either open or close the valve and so that it will not accidently work, or otherwise open and close the valve once it is actuated or shifted to either of the above-mentioned positions.

As a result of the above, when the valve is shifted to the open position where the valve element engages and seats on the seating face 36 on the insert 26 in the lower end of the body, the valve stem 56 must travel downwardly and then upwardly a short distance in the socket 60 in the valve element, against the resistance of the spring 64, after the valve element is seated and as the said central portion 84 of the cam element shifts over center.

It will be apparent that without the particular lost motion connection (60, 63 and 64), between the valve stem and valve element, or some other lost motion or resilient coupling in the drive between the cam actuator and the valve element, the cam could not be shifted over center without jamming the construction or damaging the valve element.

In the preferred carrying out of the invention, a suitable cam follower is provided at the upper end of the actuating stem 71. In the case illustrated, the follower is a simple, ball-bearing 85 engaged in a spherically curved pocket formed in the upper terminal end of the actuating stem.

The operating arm 78 of the means D normally projects substantially horizontally from the body 76. In the preferred form of the invention, the valve construction is related to the filler pipe 11 of the oxygen handling system B, so that the outer end portion 78' of the operating arm 78 overlies the closure cap 17 on the filler pipe, as clearly illustrated in Figs. 1 and 2 of the drawings. With this relationship of parts, it will be conveniently apparent that the operating arm 78 serves as a safety device, since the closure cap 17 cannot be unscrewed and removed from the filler pipe 11 until the arm is actuated or shifted upwardly and out of position over the cap. As pointed out above, when the arm 78 is shifted upwardly the pressure within the tank 10 is released, thereby making safe removal of the cap from the filler pipe possible.

When the valve is actuated, the operating arm 78 of the means D projects substantially vertically from the construction and out of the well 15 in which the construction is engaged, as clearly illustrated in Fig. 3 of the drawings. With this relationship of parts, the operating arm 78 serves a second function as a safety device, since it prevents the closure plate 18 for the well, from being closed, when the valve is opened.

In the form of the invention illustrated and to assure proper positioning of the actuating arm and to prevent the body of the cam actuator from overtraveling, we provide stop fingers 86 at the opposite ends of the bottom edge 81 of the cam, which fingers engage and stop against the post 70 on the cap 27, as clearly illustrated in Figs. 2 and 3 of the drawings.

The sealing means S provided by the present invention is shown as including an elongate tubular bellows 90 engaged in the upper portion of the trap chamber 21 to occur around the lower portion of the actuating stem, a top, radially projecting mounting flange 92 fixed to the upper end of the bellows 90 and seated in the annular recess 41 provided in the upper end of the body C, and a radially inwardly projecting bottom flange 93 at the lower end of the bellows and fixed to the lower end portion of the actuating stem 71.

The top flange 92 at the upper end of the bellows 90 is held in clamped sealed engagement in the recess 91 by the annular rib 42 provided on the underside of the cap 27. In practice, a suitable sealing ring 94 is interposed between the said flange 92 and the rib 42 to assure a fluid tight seal between the flange, cap and body.

The bottom flange 93 at the lower end of the bellows is secured to the lower end portion of the actuating stem 71 in such a manner as to prevent the passage of fluid therebetween and serves as a seat member for the compression spring 72 previously discussed.

With the above relationship of parts, it will be apparent that the bellows 90 of the sealing means S positively prevents the passage of fluid from the lower portion of the trap chamber 21 into the upper portion thereof where it would or could flow outwardly around the actuating stem, or out between the body C and the cap 27, but is such that it allows for free longitudinal shifting of the actuating and valve stems 71 and 56 extending into the said chamber.

In practice, the bellows is formed of bronze, or some other suitable material which is of sufficient strength to stand up under the pressures encountered in the handling of liquid oxygen and is such that it is not adversely affected by the extremes in temperature encountered in the handling of liquid oxygen.

In light of the foregoing, it will be apparent that we provide a novel valve construction particularly adapted for venting systems handling liquid oxygen, or the like, and a construction which is simple, practical and highly effective and dependable in operation.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A vent valve of the character referred to including, an elongate vertically disposed body having an upper trap chamber and an elongate lower flow chamber, an inlet port in the body and communicating with the flow chamber intermediate its ends, an outlet port in the body and communicating with the flow chamber at its lower end, a vent port in the body and communicating with the flow chamber at its upper end, valving means within the flow chamber to control the flow of fluid through the outlet and vent ports communicating therewith including vertically spaced, annular valve seats in the flow passage to occur above and below the inlet port, a valve element in the flow passage between the seats, means normally yieldingly urging the valve element into engagement with the upper seat and a longitudinally shiftable valve stem yieldingly coupled with the valve member and projecting upwardly and into the trap chamber to terminate therein, actuating means carried by the body at the upper end thereof and including a vertically shiftable actuating stem depending into the trap chamber to engage the valve stem, a lever operated over-center cam rotatably carried by the body and engaging the upper end of the actuating stem, and bellows-type sealing means between the actuating stem and the body.

2. A vent valve of the character referred to including, an elongate vertically disposed body having an upper trap chamber and an elongate lower flow chamber, an inlet port in the body and communicating with the flow chamber intermediate its ends, an outlet port in the body and communicating with the flow chamber at its lower end, a vent port in the body and communicating with the flow chamber at its upper end, valving means within the flow chamber to control the flow of fluid through the outlet and vent ports communicating therewith and having a longitudinally shiftable valve stem projecting upwardly and into the trap chamber to terminate therein, actuating means carried by the body at the upper end thereof and including a vertically shiftable actuating stem depending into the trap chamber to engage the valve stem, a lever operated over the center cam rotatably carried by the body and engaging the upper end of the actuating stem and sealing means between the actuating stem and the body, said valving means including an annular seat ring fixed in the flow chamber between the inlet and vent ports, a valve element in the flow chamber below the seat ring and yieldingly coupled with the lower end of the valve stem, and a compression spring in the flow chamber below the valve member and yieldingly urging the said member upwardly into engagement with the seat ring.

3. A vent valve of the character referred to including, an elongate vertically disposed body having an upper trap chamber and an elongate lower flow chamber, an inlet port in the body and communicating with the flow chamber intermediate its ends, an outlet port in the body and communicating with the flow chamber at its lower end, a vent port in the body and communicating with the flow chamber at its upper end, valving means within the flow chamber to control the flow of fluid through the outlet and vent ports communicating therewith and including vertically spaced valve seats in the flow passage to occur above and below the inlet port, a valve member shiftable between said seats and a longitudinally shiftable valve stem projecting upwardly and into the trap chamber to terminate therein and yieldingly coupled with the valve member, actuating means carried by the body at the upper end thereof and including a vertically shiftable actuating stem depending into the trap chamber to engage the valve stem, a lever operated over-center cam rotatably carried by the body and engaging the upper end of the actuating stem, and sealing means between the actuating stem and the body, said sealing means including a bellows sleeve engaged in the trap chamber and having a flange at its upper end secured to and sealed with the body and a flange at its lower end secured to and sealed with the actuating stem.

4. A vent valve of the character referred to including, an elongate vertically disposed body having an upper trap chamber and an elongate lower flow chamber, an inlet port in the body and communicating with the flow chamber intermediate its ends, an outlet port in the body and communicating with the flow chamber at its lower end, a vent port in the body and communicating with the flow chamber at its upper end, valving means within the flow chamber to control the flow of fluid through the outlet and vent ports communicating therewith and having a longitudinally shiftable valve stem projecting upwardly and into the trap chamber to terminate therein, actuating means carried by the body at the upper end thereof and including a vertically shiftable actuating stem depending into the trap chamber to engage the valve stem, an over center disc cam with an operating arm projecting therefrom rotatably carried by the body and engaged with the upper end of the actuating stem, and sealing means between the actuating stem and the body, said valving means including an annular seat ring fixed in the flow chamber between the inlet and vent ports, a valve element in the flow chamber below the seat ring and yieldingly coupled with the lower end of the valve stem, and a compression spring in the flow chamber below the valve member and yieldingly urging the said member upwardly into engagement with the seat ring, said sealing means including a bellows sleeve engaged in the trap chamber and having a flange at its upper end secured to and sealed with the body and a flange at its lower end secured to and sealed with the actuating stem.

5. A vent valve of the character referred to including, an elongate vertically disposed body having an upper trap chamber and an elongate lower flow chamber, an inlet port in the body and communicating with the flow chamber intermediate its ends, an outlet port in the body and communicating with the flow chamber at its lower end, a vent port in the body and communicating with the flow chamber at its upper end, valving means within the flow chamber to control the flow of fluid through the outlet and vent ports communicating therewith and including vertically spaced valve seats in the flow passage to occur above and below the inlet port, a valve member shiftable between said seats and a longitudinally shiftable valve stem projecting upwardly and into the trap chamber to terminate therein, and yieldingly coupled with the valve and member, actuating means carried by the body at the upper end thereof and including a vertically shiftable actuating stem depending into the trap chamber to engage the valve stem, a lever operated over-center cam rotatably carried by the body and engaging the upper end of the actuating stem, and sealing means between the actuating stem and the body, said actuating means including a cap secured to and closing the upper end of the body and having an upwardly projecting tubular post slidably receiving the actuating stem, a cam plate having an over-center log rotatably carried by the post and urging the upper end of the actuating stem and having a laterally projecting actuator arm projecting therefrom, and a spring in the trap chamber and engaging the actuating stem to force it upwardly into engagement with the cam plate.

6. A vent valve of the character referred to including, an elongate vertically disposed body having an upper trap chamber and an elongate lower flow chamber, an inlet port in the body and communicating with the flow chamber intermediate its ends, an outlet port in the body and communicating with the flow chamber at its lower end, a vent port in the body and communicating with the flow chamber at its upper end, valving means within the flow chamber to control the flow of fluid through the outlet and vent ports communicating therewith including vertically spaced, annular valve seats in the flow passage to occur above and below the inlet port, a valve element in the flow passage between the seats, means normally yieldingly urging the valve element into engagement with the upper seat and a longitudinally shiftable valve stem yieldingly coupled with the valve member and projecting upwardly and into the trap chamber to terminate therein, cam operated actuating means carried by the body at the upper end thereof and including a vertically shiftable actuating stem depending into the trap chamber to engage the valve stem, and sealing means between the actuating stem and the body, said actuating means including a cap secured to and closing the upper end of the body and having an upwardly projecting tubular post slidably receiving the actuating stem, an over center cam plate rotatably carried by the post and engaging the upper end of the actuating stem and having a laterally projecting actuator arm projecting therefrom, and a spring in the trap chamber and urging the actuating stem upwardly and into engagement with the cam plate, said valving means including an annular seat ring fixed in the flow chamber between the inlet and vent ports, a valve element with a central socket in the flow chamber below the seat ring and slidably receiving the lower end of the valve stem, a compression spring in the socket to urge the valve element downwardly relative to the valve stem and a compression spring in the flow chamber below the valve member and yieldingly urging the said member upwardly into engagement with the seat ring.

7. A vent valve of the character referred to including, an elongate vertically disposed body having an upper trap chamber and an elongate lower flow chamber, an inlet port in the body and communicating with the flow chamber intermediate its ends, an outlet port in the body and communicating with the flow chamber at its lower end, a vent port in the body and communicating with the flow chamber at its upper end, valving means within the flow chamber to control the flow of fluid through the outlet and vent ports communicating therewith and having a longitudinally shiftable valve stem projecting upwardly and into the trap chamber to terminate therein, over center cam operated actuating means carried by the body at the upper end thereof and including a vertically shiftable actuating stem depending into the trap chamber to engage the valve stem, and sealing means between the actuating stem and the body, said actuating means including a cap secured to and closing the upper end of the body and having an upwardly projecting tubular post slidably receiving the actuating stem, a cam plate rotatably carried by the post and engaging the upper end of the actuating stem and having a laterally projecting actuator arm projecting therefrom, and a spring in the trap chamber and engaging the actuating stem upwardly and into engagement with the cam plate, said valving means including an annular seat ring fixed in the flow chamber between the inlet and vent ports, a valve element in the flow chamber below the seat ring and yieldingly coupled with the lower end of the valve stem, and a compression spring in the flow chamber below the valve member and yieldingly urging the said chamber upwardly into engagement with the seat ring, said sealing means including a bellows sleeve engaged in the trap chamber and having a flange at its upper end secured to and sealed with the body and a flange at its lower end secured to and sealed with the actuating stem.

8. A vent valve of the character referred to including an elongate vertically disposed tubular body having a partition therein and defining an upper trap chamber and a lower elongate flow chamber, an inlet port in the body and communicating with the flow chamber at a point intermediate its ends, an outlet port in the body and communicating with the flow chamber below the inlet port and a vent port in the body and communicating with the flow chamber above the inlet port, an annular valve seat about the outlet port, an annular valve seat ring in the flow passage between the inlet and vent ports, a vertically shiftable valve member in the flow chamber and adapted to be shifted into and out of engagement with the seat and seat ring to selectively control the flow of fluid out through the outlet and vent ports, a spring in the flow chamber normally yieldingly urging the valve element upwardly therein, a vertically shiftable valve stem extending from the flow chamber through the partition and into the trap chamber, means yieldingly coupling the valve stem with the valve member, over center cam actuating means at the upper end of the body and including a vertically shiftable actuating stem depending into the trap chamber, means coupling the actuating stem with the valve stem, and bellows type sealing means in the trap chamber and sealing between the actuating stem and the body.

9. A vent valve of the character referred to including, an elongate vertically disposed tubular body having a partition therein and defining an upper trap chamber and a lower elongate flow chamber, an inlet port in the body and communicating with the flow chamber intermediate the ends, an outlet port in the body communicating with the flow chamber below the inlet port and a vent port in the body and communicating with the flow chamber above the inlet port, an annular valve seat about the outlet port, an annular valve seat ring in the flow passage between the inlet and vent ports, a vertically shiftable valve member in the flow chamber and adapted to be shifted into and out of engagement with the seat and seat ring to selectively control the flow of fluid out through the outlet and vent ports, a spring in the flow chamber normally yieldingly urging the valve element upwardly therein, a vertically shiftable valve stem extending from the flow chamber through the partition and into the trap chamber, means yieldingly coupling the valve stem with the valve member, over center cam operated actuating means at the upper end of the body and including a vertically shiftable actuating stem depending into the trap chamber, means coupling the actuating stem with the valve stem, and bellows type sealing means in the trap chamber and sealing between the actuating stem and the body, said seat ring and valve member having opposed downwardly and outwardly inclined faces, which faces are at different angles with respect to the longitudinal axis of the construction and so that they diverge radially outwardly from each other when the valve member is seated in the seat ring, said seat ring having an annular groove about the outer periphery of the inclined face and carrying a sealing ring which projects longitudinally therefrom and engages the said inclined face on the valve member when the member is seated on the ring.

10. A vent valve as set forth in claim 9 wherein said annular valve seat about the outlet port and valve member have opposed upwardly and outwardly inclined faces, which faces are at different angles with respect to the longitudinal axis of the construction and so that they diverge radially outwardly from each other when the valve member is seated on said annular seat valve, said annular valve seat having an annular groove about the outer periphery of the inclined face thereon and carrying a sealing ring which projects longitudinally therefrom and engages said opposed face on the valve member when the member is seated.

References Cited in the file of this patent

UNITED STATES PATENTS

| | | |
|---|---|---|
| 2,308,643 | Bucknam | Jan. 19, 1943 |
| 2,484,628 | Le Valley | Oct. 11, 1949 |
| 2,682,386 | Lindsay | June 29, 1954 |
| 2,703,106 | Borgerd | Mar. 1, 1955 |